No. 693,928. Patented Feb. 25, 1902.
G. ULETT.
SPINNING TOP.
(Application filed Apr. 1, 1901.)
(No Model.)
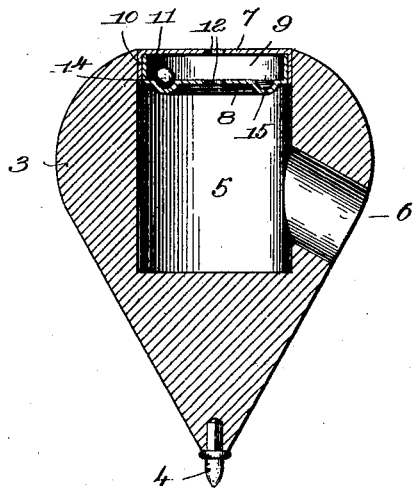
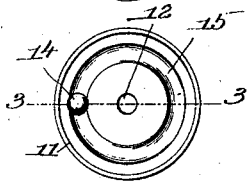
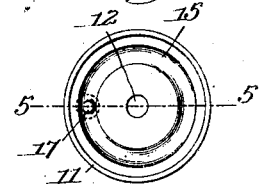
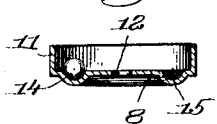
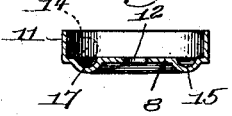
Witnesses:
Adolph O. Kaiser.
Fred S. Greenleaf.
Inventor:
George Ulett,
By Crosby Gregory,
Attys.
THE NORRIS PETERS CO., PHOTO-LITHO., WASHINGTON, D. C.

UNITED STATES PATENT OFFICE.

GEORGE ULETT, OF WALTHAM, MASSACHUSETTS.

SPINNING-TOP.

SPECIFICATION forming part of Letters Patent No. 693,928, dated February 25, 1902.

Application filed April 1, 1901. Serial No. 53,819. (No model.)

*To all whom it may concern:*

Be it known that I, GEORGE ULETT, a citizen of the United States, and a resident of Waltham, county of Middlesex, and State of Massachusetts, have invented an Improvement in Spinning-Tops, of which the following description, in connection with the accompanying drawings, is a specification, like numerals on the drawings representing like parts.

It is the object of my invention to provide a novel form of spinning-top which during the spinning thereof will produce both a whistling and a ringing sound.

The body of the top, which may be of any suitable material, is provided with a central axial chamber, and preferably the side of the top has a single transverse opening therethrough communicating with the lower portion of the central chamber. The upper end of the chamber contains a sound-producing device, which is preferably in the nature of a combined whistle and rattle, the said sound-producing device comprising two perforated disks suitably secured together and forming between them an air-chamber. As the top is spinning the air is sucked in through the perforations in the disk into the central chamber and out through the transverse opening, thus producing a whistling tone. Preferably I will place in the air-chamber a metallic ball or hammer, which during the rotation of the top strikes the disks and produces a ringing noise in addition to the whistling noise produced by the whistle.

In the drawings, Figure 1 illustrates a vertical central section of my improved top. Fig. 2 is a plan view of one of the disks comprising the sound-producing device. Fig. 3 is a section on the line 3 3, Fig 2. Fig. 4 is a plan view of a modified form of disk; and Fig. 5 is a section on the line 5 5, Fig. 4.

The top 3, which may be of any suitable material, preferably wood, has at its point the usual spike 4 and is provided with the central axial chamber 5 and the transverse opening 6 through the side of the top and communicating with the lower end of the central chamber 5. In the upper end of the chamber 5 is situated a sound-producing device, so constructed as to produce both a whistling and a ringing sound, the said sound-producing device comprising the perforated disks 7 and 8, forming between them the air-chamber 9. Preferably the said disks will be constructed with the annular flanges 10 and 11, respectively, which telescope together, as seen plainly in Fig. 1, the said flanges being fastened together in any suitable way to produce a rigid and practically integral structure.

The top is to be spun with a string in the usual way, and when it is thrown the rapid rotation thereof causes the air to be drawn in through the apertures 12 in the disks 7 and 8 and out through the transverse passage 6, thus producing a whistling noise, the enlarged central sound-chamber 5 giving to the whistling noise a sonorous quality. I find from experiment that a better sound is produced by providing a single opening 6 instead of a plurality of openings, for the sound-chamber is more inclosed and gives more volume to the sound than would be the case if a plurality of transverse openings were employed. I have also found that by making the passage-way oblique, as shown in Fig. 1, the sound of the whistle is improved.

In addition to the whistling sound my sound-producing device is capable of producing a ringing or rattling sound, and this is accomplished by inclosing in the chamber 9 a metallic ball or hammer 14, which is preferably slightly larger than the apertures 12, so as to prevent its falling out of the said air-chamber.

As the top is thrown to spin the same the ball or hammer 14 is violently thrown from one side of the chamber 9 to the other and by striking the disks 7 and 8 produces a ringing sound. Preferably the lower disk 8 will be provided with the annular groove 15, shaped to fit the hammer 14. After the top has been thrown the ball or hammer 14 is gradually given the same angular velocity as the top, so that it rotates with the top, it then settling into the groove and ceasing striking the disks 7 and 8 to produce the ringing sound.

With a top constructed as shown in Fig. 1, therefore, the combined whistling and ringing noise is produced when the top is first thrown; but gradually the ringing noise disappears, while the whistling noise continues so long as the top is spinning.

If it is desired to prolong the duration of the ringing noise, I may provide the groove 15 with the stop or prong 17, this modification being illustrated in Figs. 4 and 5, the said prong operating to throw the ball out of the groove and cause it to strike the disks to produce the ringing noise.

Various changes may be made in the structure of my device without departing from the spirit of my invention.

Having described my invention, what I claim as new, and desire to secure by Letters Patent, is—

1. A spinning-top having a central axial chamber and a transverse opening through the side of the top and leading into the central chamber above the bottom thereof, the said central chamber being larger than the transverse opening whereby a sound-chamber is formed, combined with a whistling device confined in the upper end of said axial chamber, the said whistling device comprising two perforated disks each provided with an annular cylindrical flange, the annular flange of one disk being telescoped into the flange of the other disk.

2. A spinning-top having a central axial chamber of uniform bore, a combined whistle and rattle confined in the upper end of said chamber, and an oblique transverse opening through the side of the top and leading into the chamber above the bottom thereof, said chamber being larger than the transverse opening whereby a sound-chamber is produced.

3. A spinning-top having a central axial chamber, a transverse opening through the side of the top at the lower end of the chamber, and a combined whistle and rattle in the upper end of said chamber.

4. A spinning-top having a central axial chamber, a transverse opening through the side of the top at the lower end of said chamber, a sound-producing device in the upper end of said chamber, said sound-producing device comprising two perforated disks forming between them an air-chamber, and a metallic ball confined in said chamber.

5. A spinning-top having a central axial chamber, a transverse opening through the side of the top at the lower end of said chamber, a sound-producing device in the upper end of said chamber, said sound-producing device comprising two perforated disks forming between them an air-chamber, and a metallic ball confined in said chamber, one of said disks having an annular groove therein and shaped to fit the ball.

6. A spinning-top having a central axial chamber, a transverse opening through the side of the top at the lower end of said chamber, a sound-producing device in the upper end of said chamber, said sound-producing device comprising two perforated disks forming between them an air-chamber, a metallic ball confined in said chamber, one of said disks having an annular groove therein and shaped to fit the ball, and a prong or projection in said groove.

In testimony whereof I have signed my name to this specification in the presence of two subscribing witnesses.

GEORGE ULETT.

Witnesses:
JOHN C. EDWARDS,
LOUIS C. SMITH.